(12) United States Patent
Chen

(10) Patent No.: US 12,411,391 B1
(45) Date of Patent: Sep. 9, 2025

(54) FOLDABLE SOFTBOX CHUCK

(71) Applicant: Wenzhou Jiebao Technology Co., Ltd., Yueqing (CN)

(72) Inventor: Qingyuan Chen, Yueqing (CN)

(73) Assignee: Wenzhou Jiebao Technology Co., Ltd., Yueqing (CN)

( * ) Notice: Subject to any disclaimer, the term of this patent is extended or adjusted under 35 U.S.C. 154(b) by 0 days.

(21) Appl. No.: 19/208,298

(22) Filed: May 14, 2025

(30) Foreign Application Priority Data

Feb. 12, 2025 (CN) .......................... 202520221393.2

(51) Int. Cl.
  *G03B 15/06* (2021.01)
(52) U.S. Cl.
  CPC .................... *G03B 15/06* (2013.01)
(58) Field of Classification Search
  CPC ..... G03B 15/06; G03B 17/56; G03B 2217/00
  See application file for complete search history.

(56) References Cited

FOREIGN PATENT DOCUMENTS

| CN | 116643440 | A | * | 8/2023 | ............. | G03B 15/06 |
|---|---|---|---|---|---|---|
| CN | 219574568 | U | * | 8/2023 | ............. | G03B 15/06 |
| CN | 117348314 | A | * | 1/2024 | ............. | G03B 15/06 |
| CN | 220820439 | U | | 4/2024 | | |
| CN | 220820440 | U | | 4/2024 | | |
| CN | 220829645 | U | | 4/2024 | | |
| KR | 20200134916 | A | * | 12/2020 | ............. | G03B 15/06 |
| WO | WO-2020213859 | A1 | * | 10/2020 | ............. | G03B 15/06 |

OTHER PUBLICATIONS

Wikipedia article on Central Angle, Nov. 20, 2023 [retrieved on Jul. 7, 2025] <URL:https://en.wikipedia.org/wiki/Central_angle>.*

* cited by examiner

*Primary Examiner* — Christopher E Mahoney
(74) *Attorney, Agent, or Firm* — Nitin Kaushik

(57) ABSTRACT

A foldable softbox chuck is disclosed, including: a first base in the form of an open ring structure with a notch, the central angle of which is greater than 180°; a second base rotatably connected to the first base; a locking mechanism configured for locking or unlocking the first base and the second base; wherein the first base and the second base have at least a folded state and an unfolded state; in the unfolded state, the first base and the second base are located in a same plane, and the second base forms a complete annular shape by complementing the notch; and in the folded state, the first base and the second base are stacked one on top of the other. It greatly reduces the space occupied, which is convenient for transportation and carrying. The stability of the softbox chuck is improved when unfolded and in use.

10 Claims, 19 Drawing Sheets

FOLDABLE SOFTBOX CHUCK

CROSS-REFERENCE TO RELATED APPLICATIONS

The application claims priority to Chinese patent application No. 2025202213932, filed on Feb. 12, 2025, the entire contents of which are incorporated herein by reference.

TECHNICAL FIELD

The present application belongs to the technical field of photographic auxiliary equipment, and particularly relates to a foldable softbox chuck.

BACKGROUND

The softbox includes a circular chuck located in the middle, a support rod movably connected to the chuck, and a softbox fabric connected to the support rod. The support rod is stretched to be umbrella-shaped when in use. When the support rod is stored, a plurality of support rods are folded on the periphery of the circular chuck to be in a three-dimensional state. The storage volume is relatively large, causing inconvenience to carry and transport it. Foldable softbox chucks have been developed on the market to solve the above problems. The softbox chucks are designed as semi-circular structures, which are not structurally stable when unfolded and used, and require a chassis for support.

SUMMARY

In order to overcome the deficiencies of the prior art, the present application provides a foldable softbox chuck, which is flat and occupies a small space in a folded state, the central angle of a first base is greater than 180 degrees. In the unfolded state, the second base compensates for the notch of the first base to form a complete annular shape, so that the unfolded support structure of the softbox chuck is more stable.

The technical solution adopted by the present application to solve the technical problem thereof is a foldable softbox chuck, including:
  a first base in the form of an open ring structure with a notch, the central angle of which is greater than 180°;
  a second base rotatably connected to the first base;
  a locking mechanism configured for locking or unlocking the first base and the second base;
  wherein the first base and the second base have at least a folded state and an unfolded state; in the unfolded state, the first base and the second base are located in a same plane, and the second base forms a complete annular shape by complementing the notch; and in the folded state, the first base and the second base are stacked one on top of the other.

The present application uses the relative rotation of the first base and the second base to achieve the superposition of the two, so that the softbox folds to a flat shape when being stored. Compared with the case where the chuck and the support piece are in a three-dimensional state when being folded, the space occupied thereby is greatly reduced, which is convenient for transportation and carrying. The central angle of the first base is greater than 180°, and the second base compensates for the notch of the first base to form a complete annular shape, so that when the softbox chuck is unfolded and used, it is a semi-circular structure with respect to both the first base and the second base, and the stability of the unfolded use thereof is improved. When the softbox is in an unfolded state, it can be ensured to be located in the same plane, and the overall structure is relatively stable.

Further, in the unfolded state, the second base compensates for the notch to form a complete annular shape, and the inner ring and the outer ring of the annular shape are both complete circles with smooth transitions. The first base and the second base in the unfolded state present a complete annular shape. The inner ring and the outer ring are smooth transition. The overall structure is simpler. The stress of the softbox chuck is relatively balanced everywhere in the circumferential direction.

Further, the first base includes a first base body, and a first extension arm extending circumferentially from an end portion of the first base body; the radial width of the first extension arm is less than a radial width of the first base body; the notch includes an inner notch formed between end portions of the adjacent first extension arms and an outer notch formed between end portions of the first base body; the second base includes a second base body, and a protrusion protruding from an inner ring of the second base body; the protrusion forms a complete annular shape by complementing the inner notch; and the second base body forms a complete annular shape by complementing the outer notch. The Protrusion increases the mechanical strength of the second base. In the unfolded state, the protrusion compensates for the inner notch, and the second base body compensates for the outer notch, so that the first base and the second base form a complete annular shape, increasing the structural stability of the softbox chuck in a circumferential circle. The provision of the protrusion provides sufficient space for the locking mechanism to be installed and also prevents light from escaping from the inner notch.

Further, the central angle of the first base body is 180°, and the central angle of the second base body is 180°. The semi-circular first base body and second base body are used to respectively connect the first support piece and the second support piece. The number of the first support piece and the second support piece is equal. The forces applied on both sides of the periphery of the softbox chuck are relatively balanced.

Further, the locking mechanism locks the first base and the second base in a radial direction; or, the locking mechanism locks the first base and the second base in radial and circumferential directions.

Further, the locking mechanism includes an unlocking member, a locking member cooperating with the unlocking member, a reset member abutting against the locking member, and a locking slot, wherein the locking member and the locking slot are respectively provided on the first base or the second base; and an external force is applied to drive the unlocking member to move, and the locking member can be driven to move, so that part of the locking member enters or leaves the locking slot.

Further, the number of the locking member and the locking slot are both two; the number of the unlocking member is one; and the unlocking member moves in a radial direction to drive the two locking members to move synchronously. The action of one unlocking member can drive the synchronous movement of two locking members. The movement includes rotation and movement. The action of one unlocking member can achieve the synchronous unlocking of two locking members, and the operation is more convenient.

Further, the locking slot is provided on an outer side surface of the first base and is provided close to the notch; and the locking member is rotatably connected to the second base, and has a locking part having an inclined guide surface. The locking slot is provided close to the notch, so that the locking of the first base and the second base is more stable, and it is also convenient to provide the locking member on the second base. The inclined guide surface facilitates sliding movement of the locking part into the locking slot.

Further, the locking slot is provided at an end portion of the first base and has an inclined abutment surface; and the locking member is rotatably connected to the second base and has a locking part which forms an inclined surface capable of abutting against the abutment surface and has a beveled surface capable of abutting against an inner top surface of locking slot. The inclined surface of the locking part and the abutment surface are inclined to abut against each other. There is a locking force in both the radial direction and the circumferential direction, so that the locking is stable.

Further, the second base is provided with a handle which extends obliquely and which is arranged in correspondence with the protrusion. The handle is provided to facilitate the unfolded and stored operations of the first base and the second base.

According to the beneficial effects of the present application, by using the rotation of the second base relative to the first base, the first base and the second base can be folded up and down, so that the softbox folds to a flat shape when being stored, and the space occupied thereby is greatly reduced, which is convenient for transportation and carrying. The central angle of the first base is greater than 180°, and the second base compensates for the notch of the first base to form a complete annular shape, so that when the softbox chuck is unfolded and used, it is a semi-circular structure with respect to both the first base and the second base, and the stability of the unfolded use thereof is improved. When the softbox is in an unfolded state, it can be ensured to be located in the same plane, and the overall structure is relatively stable. The protrusion increases the mechanical strength of the second base, and the protrusion thereof into the notch also prevents light from leaking out of the notch. The protrusion fills the notch, which not only provides an installation space for the arrangement of the locking mechanism, but also increases the structural stability of the softbox chuck in a circumferential circle. The structural arrangement of the locking mechanism makes the locking of the first base and the second base more stable. When unlocking, only an external force needs to be applied to the unlocking member, so that the operation is more convenient. The number of unlocking members is one, and it is arranged at the radially outer ring of the softbox chuck. The unlocking of the two locking members can be achieved by pressing inwards when unlocking, and the operation is convenient.

Among them, 1—first base, 11—first base body, 12—first extension arm, 2—second base, 21—second base body, 22—protrusion, 3—notch, 31—inner notch, 32—outer notch, 4—locking mechanism, 41—unlocking member, 42—locking member, 421—locking part, 422—inclined guide surface, 423—another locking part, 424—inclined surface, 425—beveled surface, 43—reset member, 44—locking slot, 441—abutment surface, 442—inner top surface of locking slot, 5—handle.

DETAILED DESCRIPTION OF THE EMBODIMENTS

In order to enable those skilled in the art to better understand the technical solution of the present application, a clear and complete description of the technical solution of the embodiments of the present application will be given below with reference to the accompanying drawings of the embodiments of the present application. It is obvious that the embodiments described are only a part of the embodiments of the present application, rather than all the embodiments. Based on the embodiments of the present application, all the other embodiments obtained by a person of ordinary skill in the art without involving any inventive effort should fall within the scope of protection of the present application.

As shown in FIGS. 1 to 9, a foldable softbox chuck includes a first base 1, a second base 2 rotatably connected to the first base 1, and a locking mechanism 4. The first base 1 has an open annular shape with a notch 3, and may be provided with a plurality of first support pieces at the outer periphery thereof. The central angle of the first base 1 is greater than 180°. In other words, the central angle of the notch 3 is less than 180°.

Figure 1:
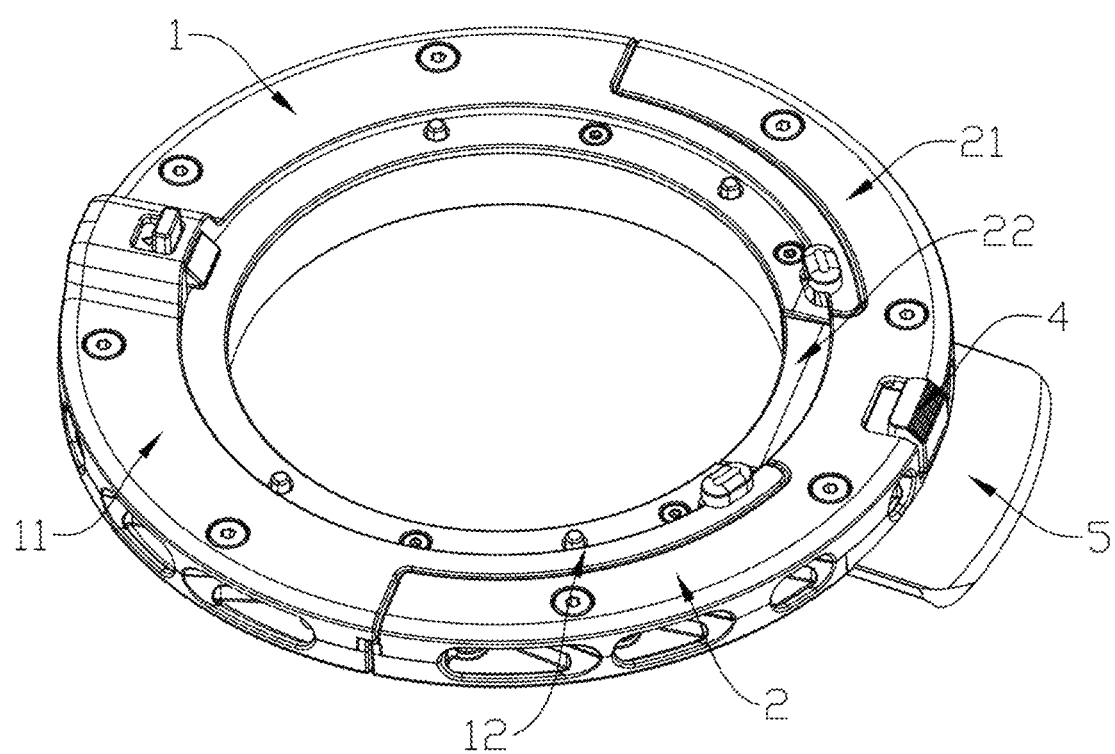
FIG. 1 is a perspective view I of a softbox chuck provided in the present application, which is in an unfolded state.
Figure 2:
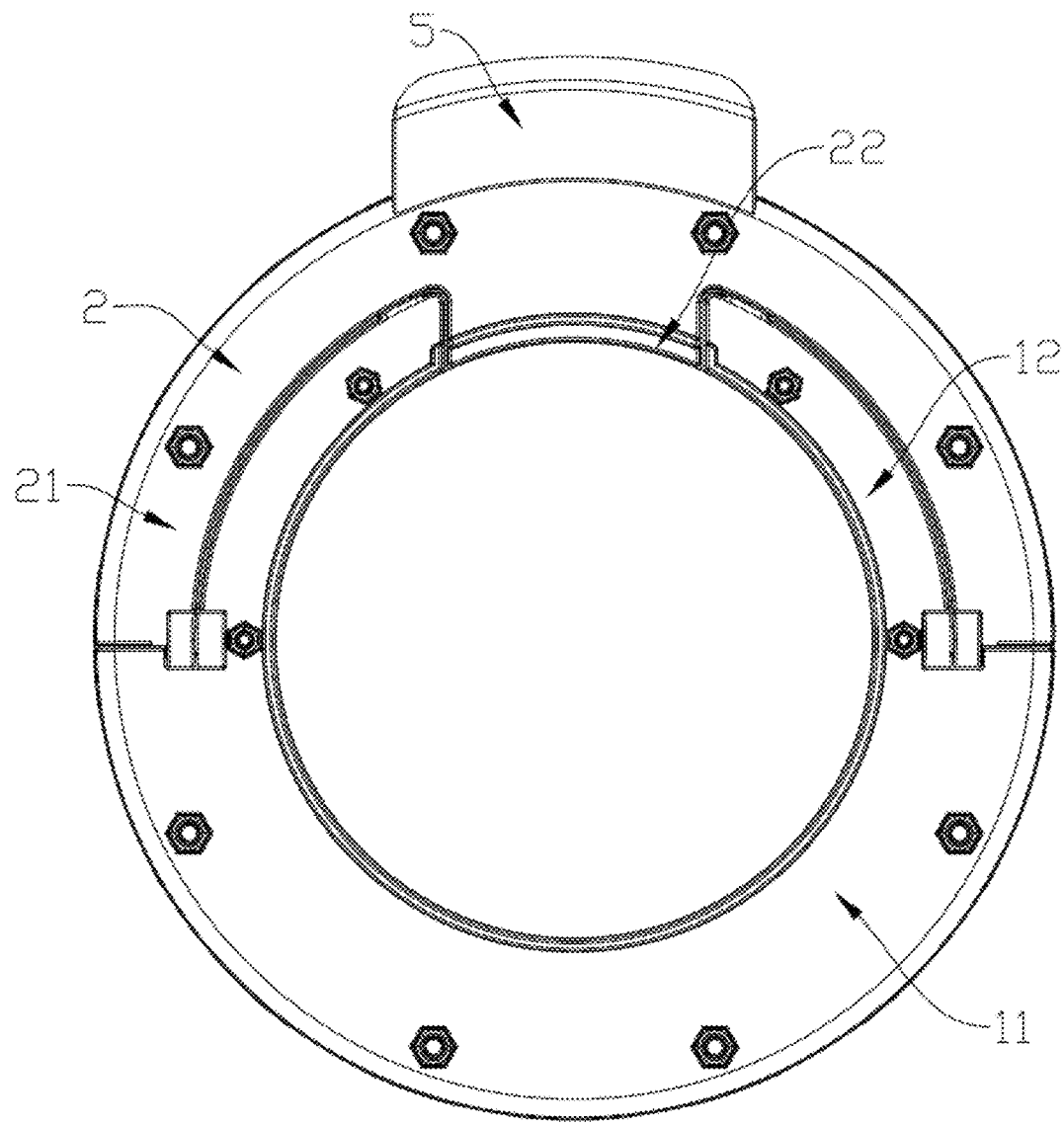
FIG. 2 is a bottom view of the softbox chuck provided in the present application, which is in an unfolded state.

The first base 1 and the second base 2 have at least a folded state and an unfolded state. In the unfolded state, the first base 1 and the second base 2 are located in the same plane, and the second base 2 compensates for the notch 3 to form a complete annular shape, as shown in FIGS. 1 and 2. The inner ring and the outer ring of the annular shape are both a smooth transition complete circle. In other words, the radial width of the annular shape is substantially equal everywhere in the circumferential direction.

Figure 9:
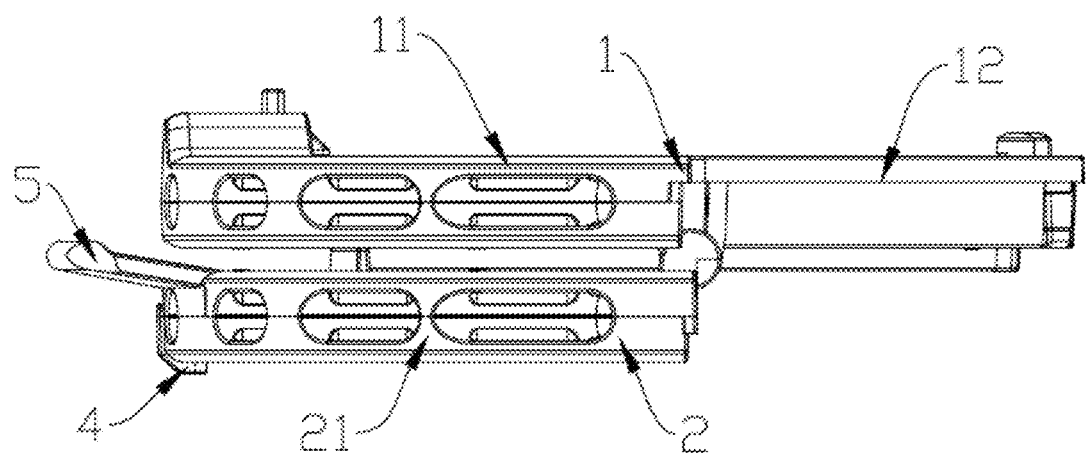
FIG. 9 is a side view II of the softbox chuck provided in the present application, which is in a folded state.

As shown in FIG. 9, in the folded state, the first base 1 and the second base 2 are stacked on top of each other. At this time, the first support piece on the first base 1 and the second support piece on the second base 2 are located on the same side, so that the softbox can be folded and stored as a whole into a flat shape, and occupies a small space when being stored.

Figure 5:
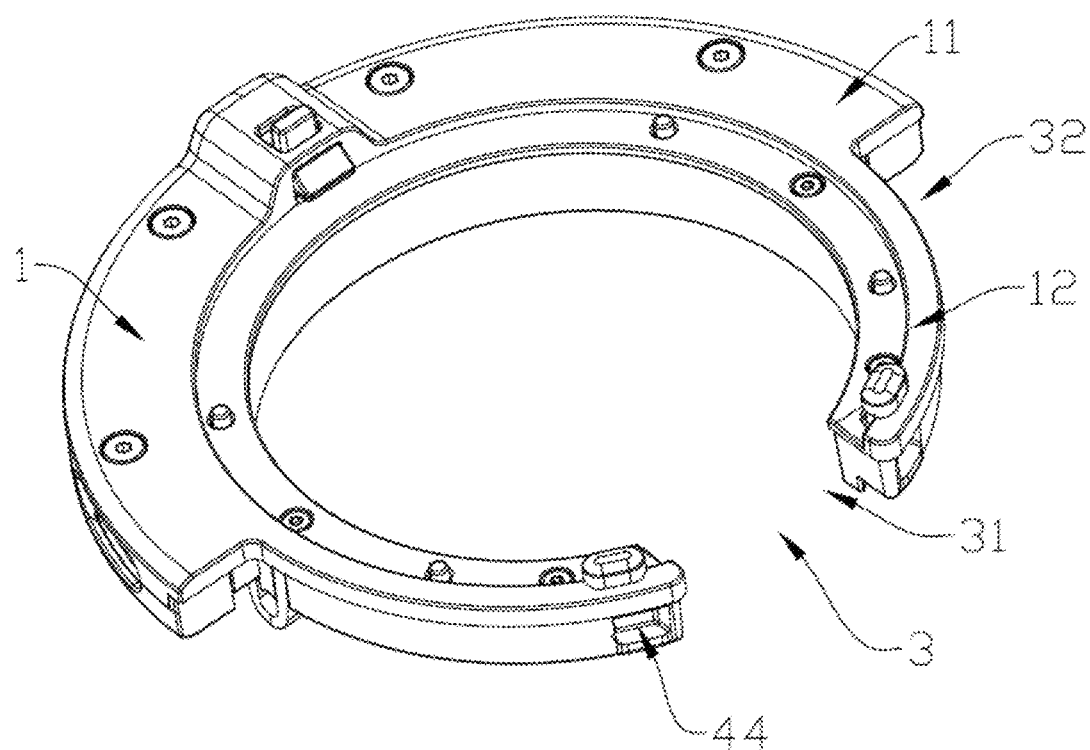
FIG. 5 is a perspective view I of a first base provided in the present application.

Specifically, as shown in FIG. 5, the first base 1 includes a first base body 11, and a first extension arm 12 extending in a circumferential direction from an end portion of the first base body 11, the first extension arm 12 having a radial width less than that of the first base body 11. In the present embodiment, both ends of the first base body 11 extend in the circumferential direction to form the first extension arms 12, and the lengths of the two first extension arms 12 are substantially equal. The central angle of the first base body 11 is 180°, i.e., the first base body 11 is semi-circular. Of course, in other embodiments, it may not be semi-circular and is not intended to be limiting.

Thus, the notch 3 includes an inner notch 31 formed between the end portions of the adjacent first extension arms 12 and an outer notch 32 formed between the two end portions of the first base body 11. That is, the outer notch 32 formed between the areas where the first extension arms 12 do not extend at both ends of the first base body 11, the outer notch 32 being located at the outer ring of the inner notch 31.

Figure 6:
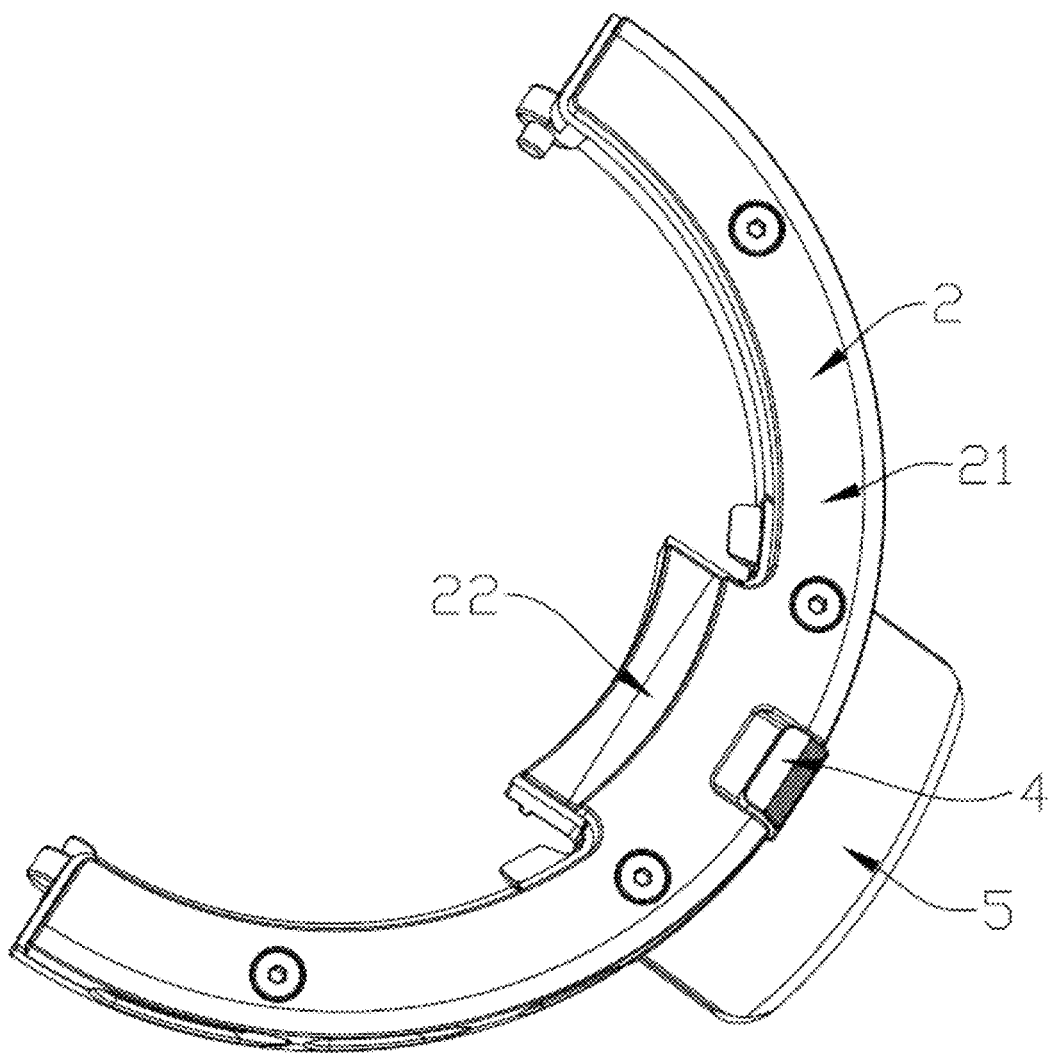
FIG. 6 is a perspective view of a second base provided in the present application.
Figure 7:
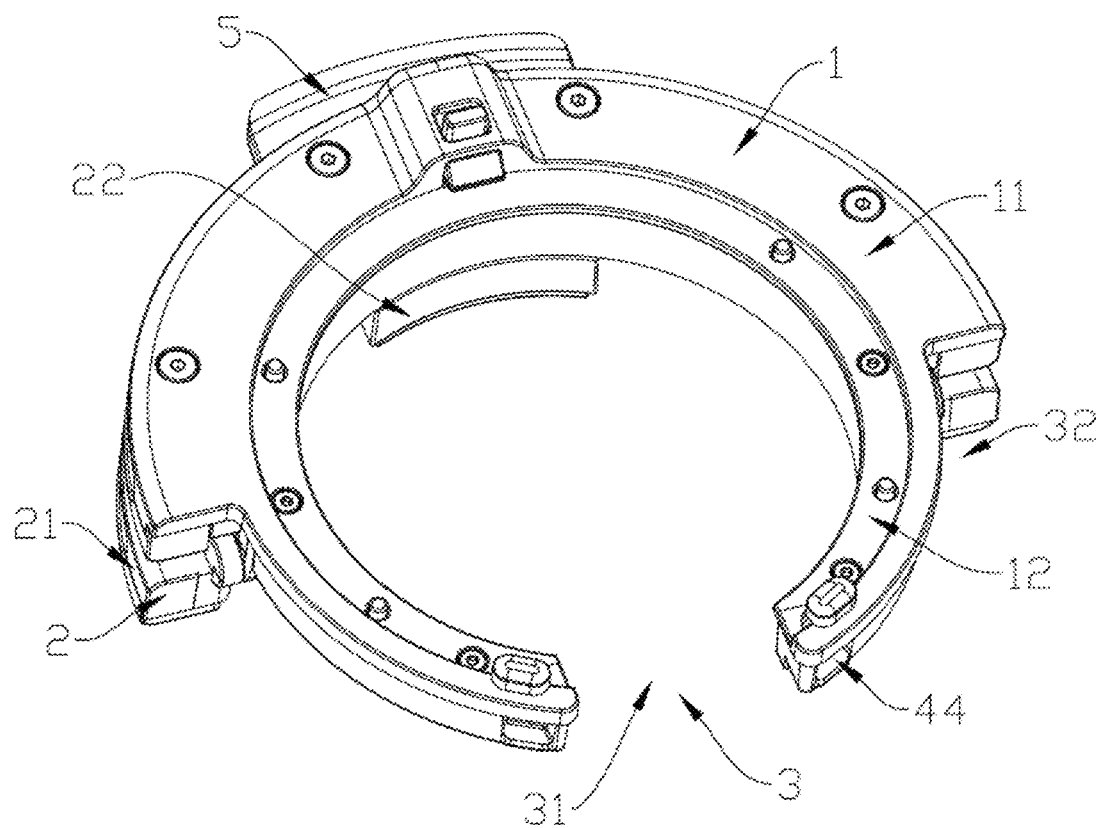
FIG. 7 is a perspective view II of the softbox chuck provided in the present application, which is in a folded state.
Figure 8:
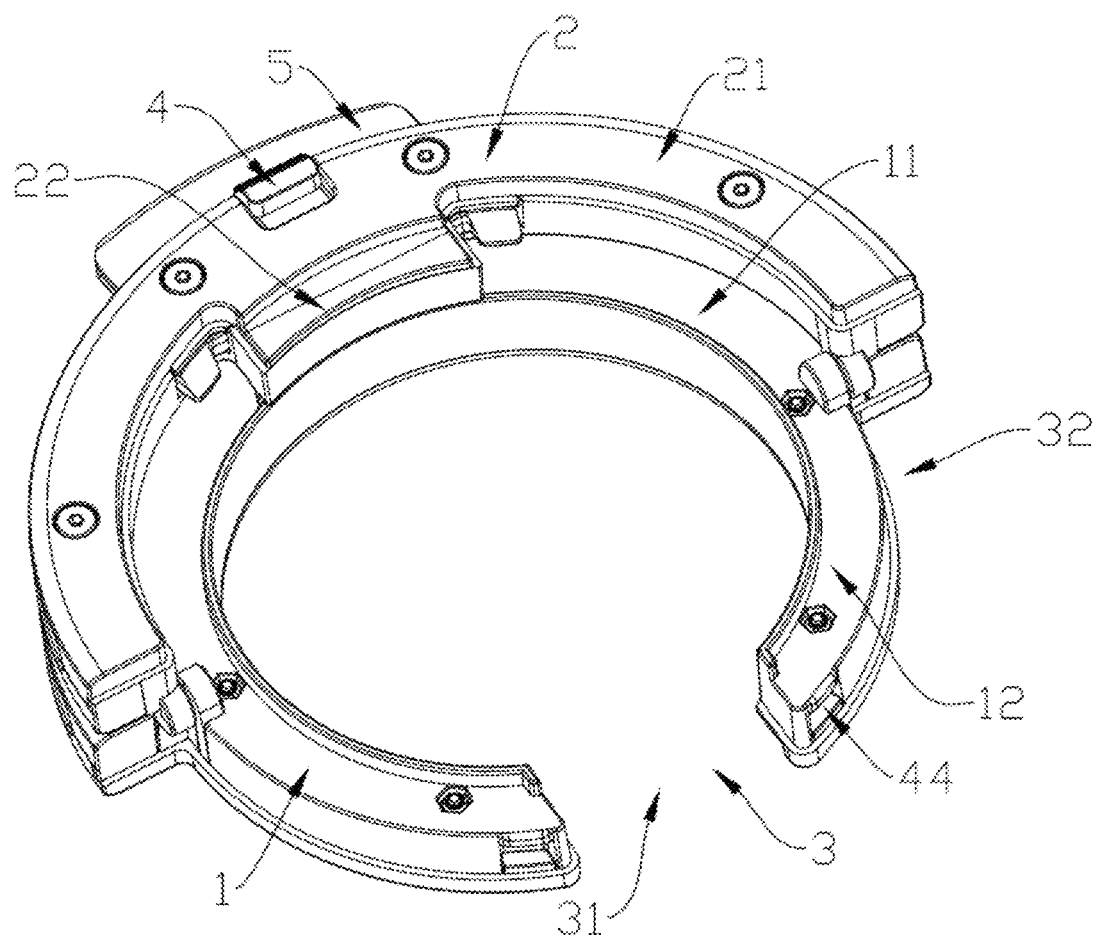
FIG. 8 is a perspective view III of the softbox chuck provided in the present application, which is in a folded state.

As shown in FIG. 6, the second base 2 includes a second base body 21, and a protrusion 22 protruding from an inner periphery of the second base body 21. The protrusion 22 forms a complete annular shape by complementing the inner notch 31, and the second base body 21 forms a complete annular shape by complementing the outer notch 32. In other words, the radial width and the circumferential direction of the protrusion 22 are substantially equal to the inner notch 31, and the radial width and the circumferential direction of the second base body 21 are substantially equal to the outer notch 32. In the present embodiment, the central angle of the second base body 21 is 180°, i.e., the second base body 21 has a semi-circular shape. Of course, in other embodiments, it may not have a semi-circular shape, and the present invention is not limited thereto.

The locking mechanism 4 serves to lock or unlock the first base 1 and the second base 2. When the first base 1 and the second base 2 are in the unfolded state, the locking mechanism 4 locks the first base 1 and the second base 2 such that they are stably maintained in the unfolded state. When the locking mechanism 4 unlocks the first base 1 and the second base 2, it can be switched from the unfolded state to the folded state.

Figure 4:
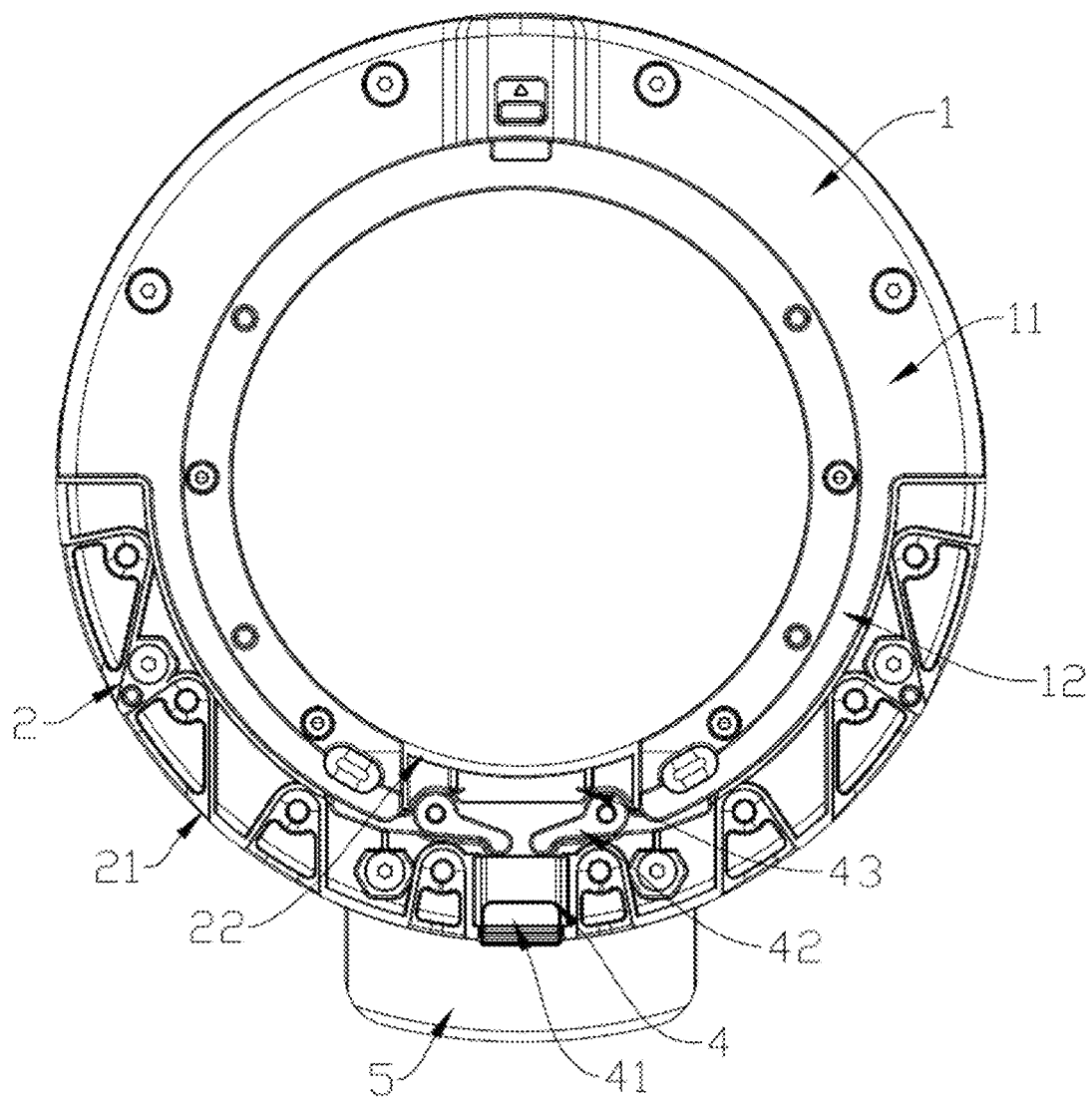
FIG. 4 is an internal schematic view I of the softbox chuck provided in the present application.
Figure 10:
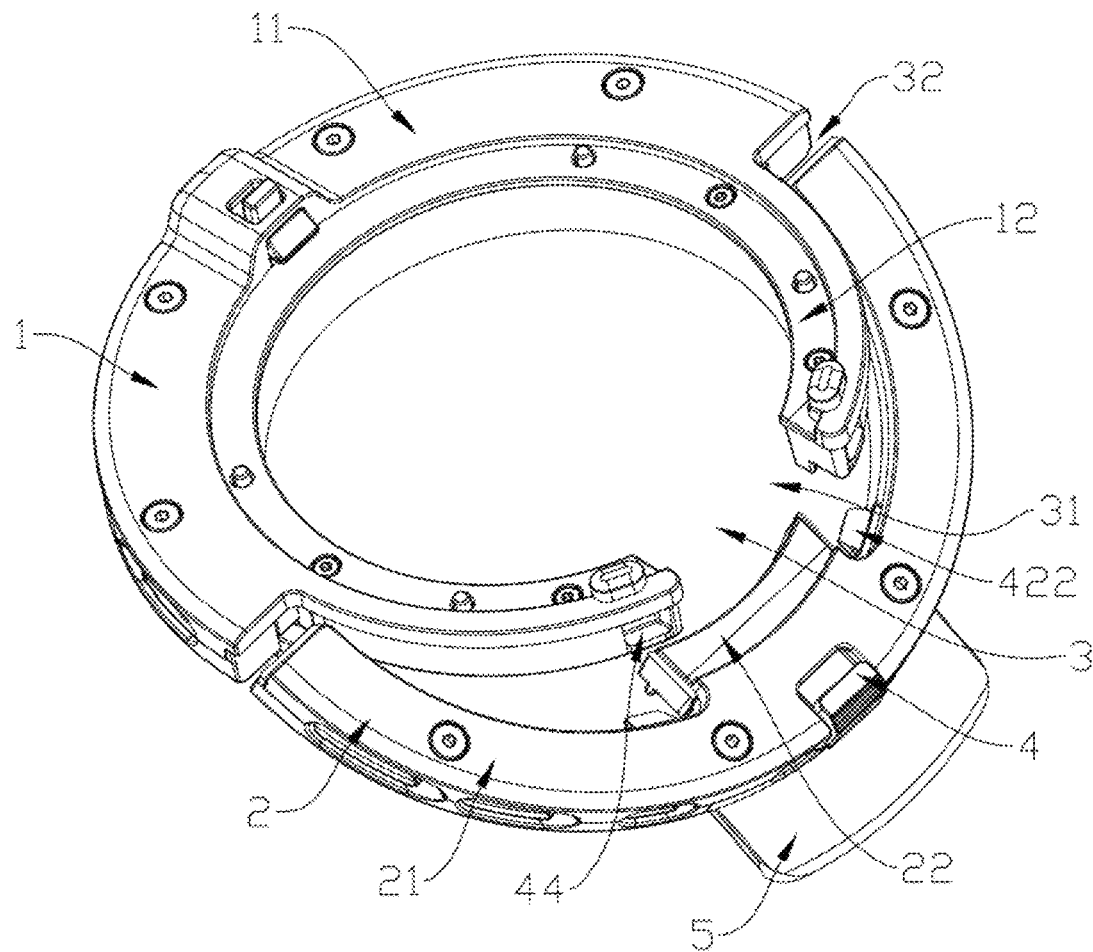
FIG. 10 is a perspective view IV of the softbox chuck provided in the present application, which is in the process of switching between an unfolded state and a folded state.
Figure 11:
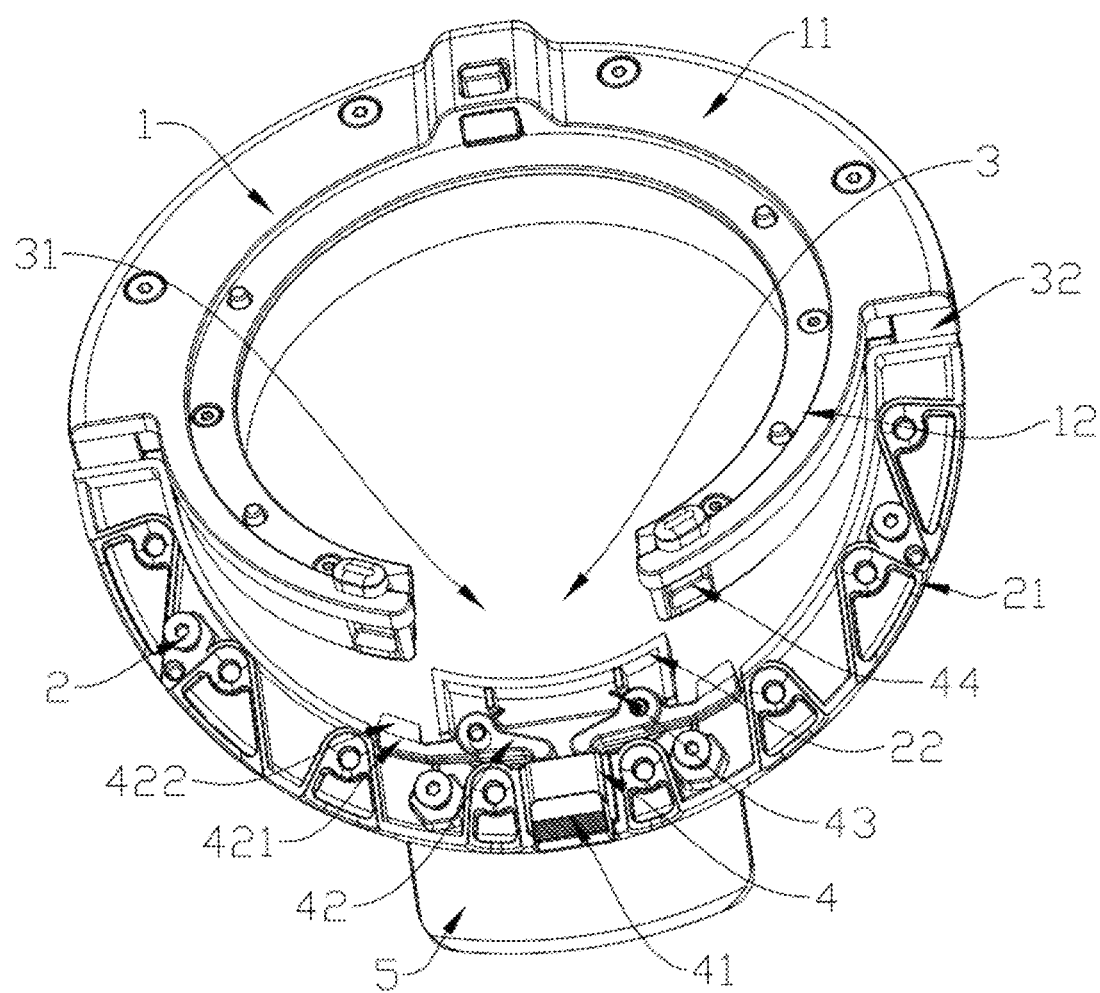
FIG. 11 is an internal schematic view II of the softbox chuck provided in the present application.
Figure 12:
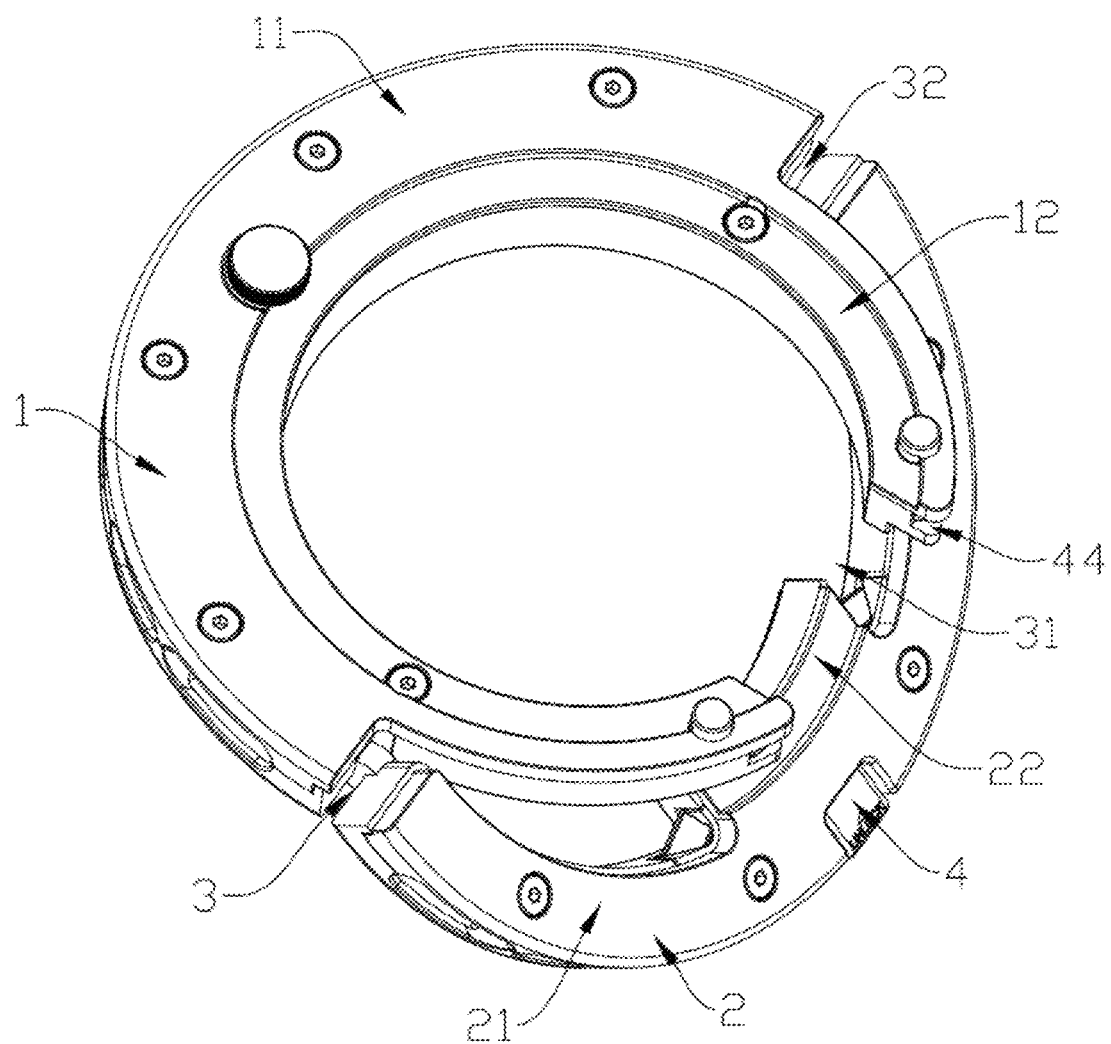
FIG. 12 is a perspective view V of the softbox chuck provided in the present application, which is in the process of switching between an unfolded state and a folded state.
Figure 13:
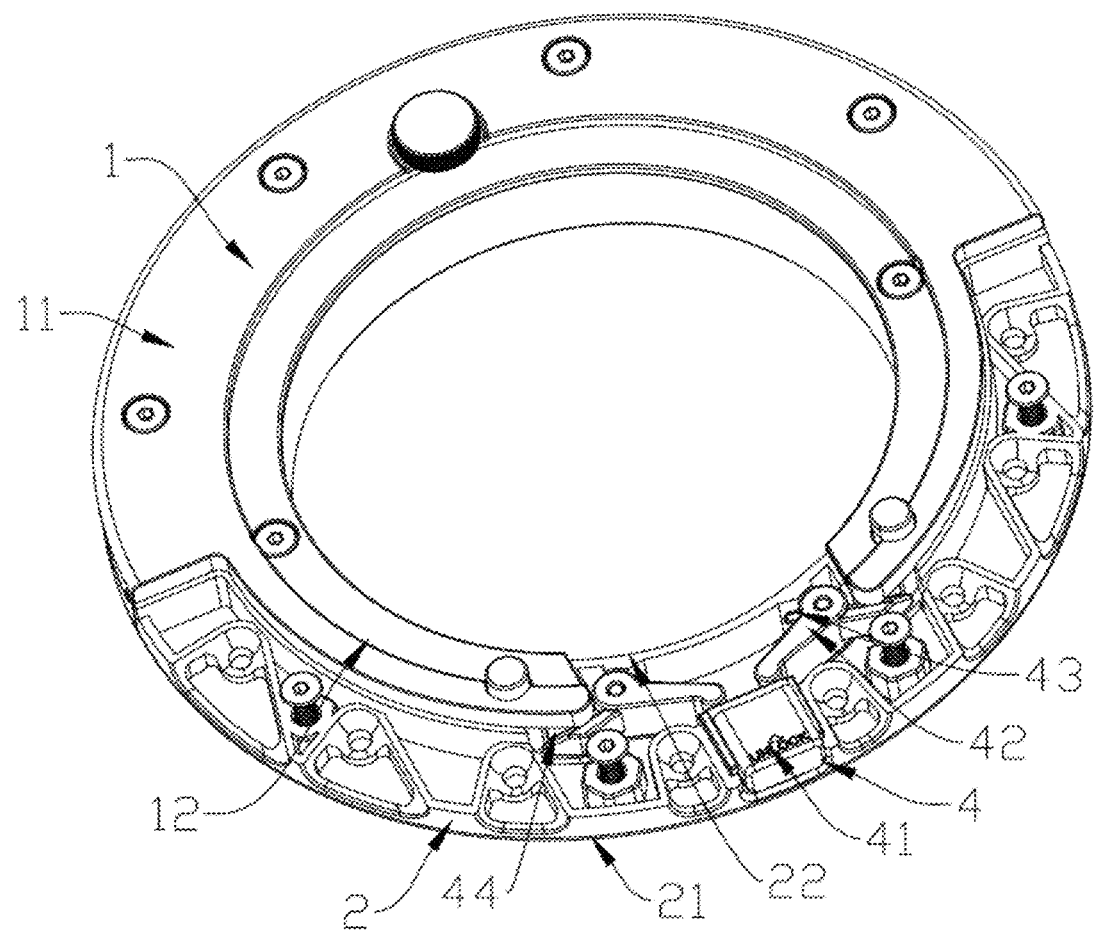
FIG. 13 is an internal schematic view III of the softbox chuck provided in the present application.

As shown in FIGS. 4, 10 and 11, the locking mechanism 4 locks the first base 1 and the second base 2 in a radial direction. The locking mechanism 4 includes an unlocking member 41, a locking member 42 cooperating with the unlocking member 41, a reset member 43 abutting against the locking member 42, and a locking slot 44. Herein, the locking member 42 and the locking slot 44 are respectively provided on the first base 1 or the second base 2. When an external force is applied to drive the unlocking member 41 to move, the locking member 42 can be driven to move, so that part of the locking member 42 enters or leaves the locking slot 44.

Specifically, in the present embodiment, the locking members 42 are rotatably connected to the second base 2, and, specifically, are provided at positions corresponding to the protrusions 22. The number of the locking members 42 is two, and the locking member 42 has a locking part 421 which has an inclined guide surface 422. The locking slots 44 are provided on the outer side surface of the first base 1, in particular, on the outer side surface of the first extension arm 12 adjacent to the notch 3. Accordingly, the number of the locking slots 44 is also two, and the positions thereof correspond to the locking members 42.

The number of unlocking members 41 is one, and the unlocking members 41 are respectively in abutting engagement with the two locking members 42. When an external force is applied to make the unlocking members 41 move along the radial direction of the foldable softbox chuck, the two locking members 42 can be driven to rotate synchronously, so that the locking part 421 can be disengaged from the locking slot 44 to achieve the unlocking of the first base 1 and the second base 2. The first base 1 and the second base 2 can rotate freely, and switch from an unfolded state to a folded state. At this time, the external force applied to the unlocking member 41 is stopped, and the locking member 42 is automatically reset by the elastic force of the reset member 43. In the present embodiment, the reset member 43 is a torsion spring of which one open end abuts against the locking part 421 and the other open end abuts against the second base 2.

When the first base 1 and the second base 2 are switched from the folded state to the unfolded state, the inclined guide surface 422 of the locking part 421 abuts against a region of the surface of the first extension arm 12 corresponding to the locking slot 44, and rotates against the reset member 43 until the locking part 421 enters the locking slot 44, thereby locking the first base 1 and the second base 2. In order to facilitate the sliding of the locking part 421 into the locking slot 44, a region of the surface of the first extension arm 12 corresponding to the locking slot 44 may be provided as a curved surface. In order to increase the contact area between the locking part 421 and the locking slot 44, the inner bottom surface of the locking slot 44 protrudes from the outer side surface of the first extension arm 12.

Since the above-described structure is such that the locking part 421 is radially inserted into the locking slot 44, the locking mechanism 4 is defined to radially lock the first base 1 and the second base 2. Of course, in other embodiments, the locking mechanism 4 may lock the first base 1 and the second base 2 in both the radial direction and the circumferential direction.

Figure 14:
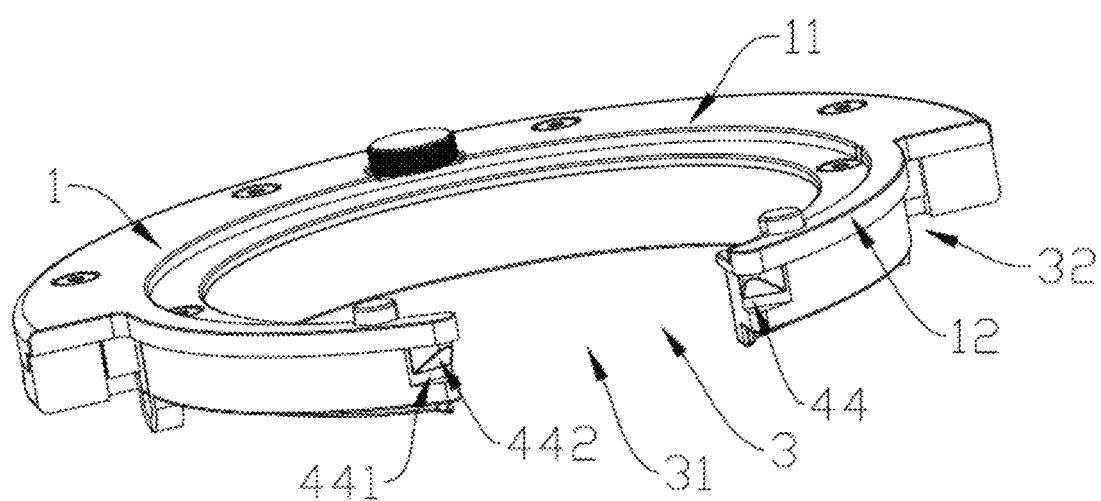
FIG. 14 is a perspective view II of the first base provided in the present application.
Figure 15:
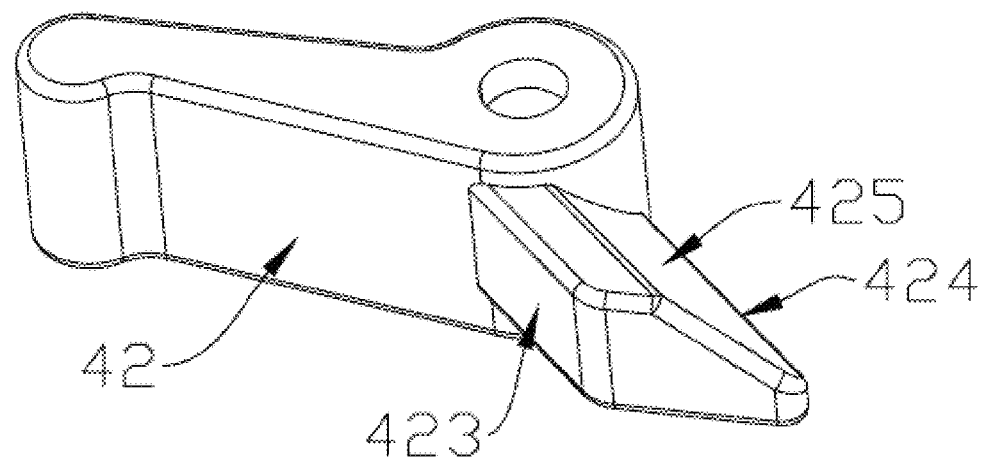
FIG. 15 is a perspective view of a locking member provided in the present application.

As shown in FIGS. 12-19, unlike the structure and arrangement position of the locking slot 44 described above, the locking slot 44 is provided at the end portion of the first base 1. Specifically, the locking slot 44 is provided at the end portion of the first extension arm 12, and extends the end surface and the outer side surface of the first extension arm 12. As shown in FIG. 14, the side portion of the locking slot 44 has an inclined abutment surface 441 extending obliquely from the outer periphery of the first extension arm 12 towards the inner ring in a direction deviated from the center of the circle. The top of the locking slot 44 has an inclined inner top surface 442 which extends obliquely in the thickness direction of the first extension arm 12. As shown in FIG. 15, the locking member 42 rotatably connected to the second base 2 has another structure of a locking part 423 formed with an inclined surface 424 abutting against the abutment surface 441 and a beveled surface 425 abutting against the inner top surface of locking slot 442.

Figure 16:
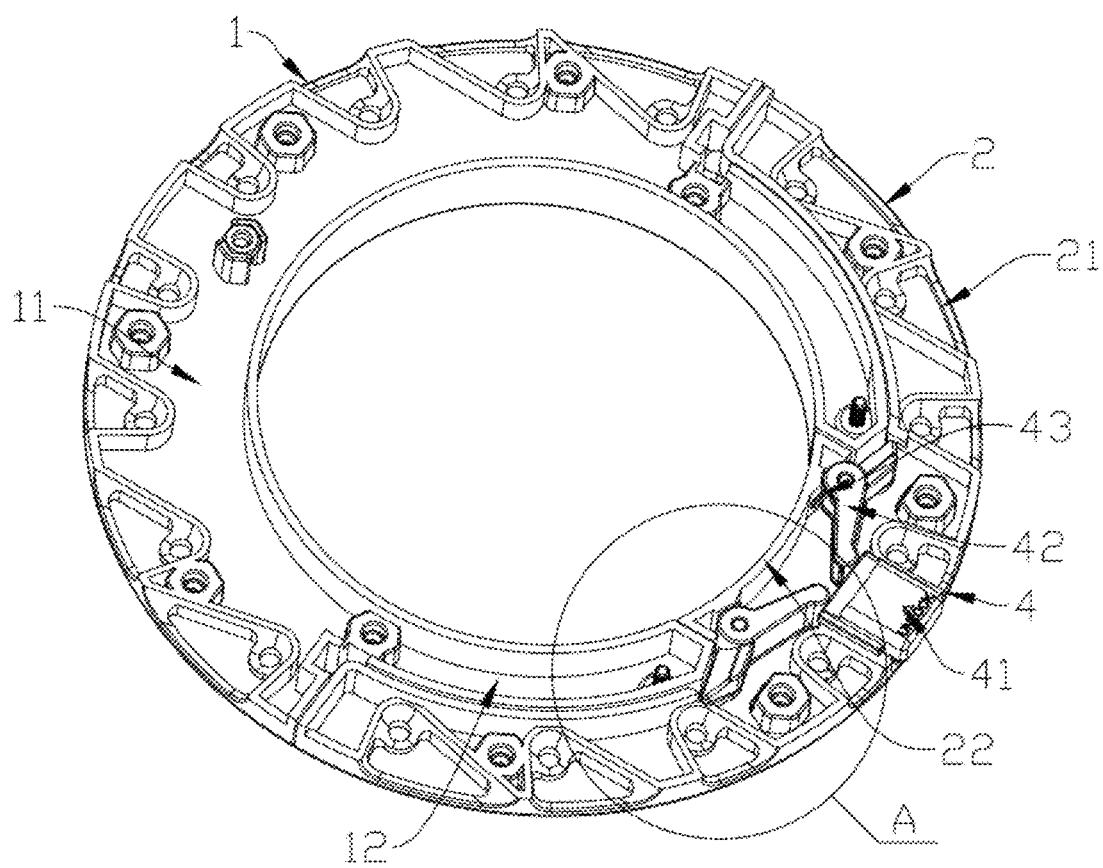
FIG. 16 is an internal schematic view IV of the softbox chuck provided in the present application.
Figure 17:
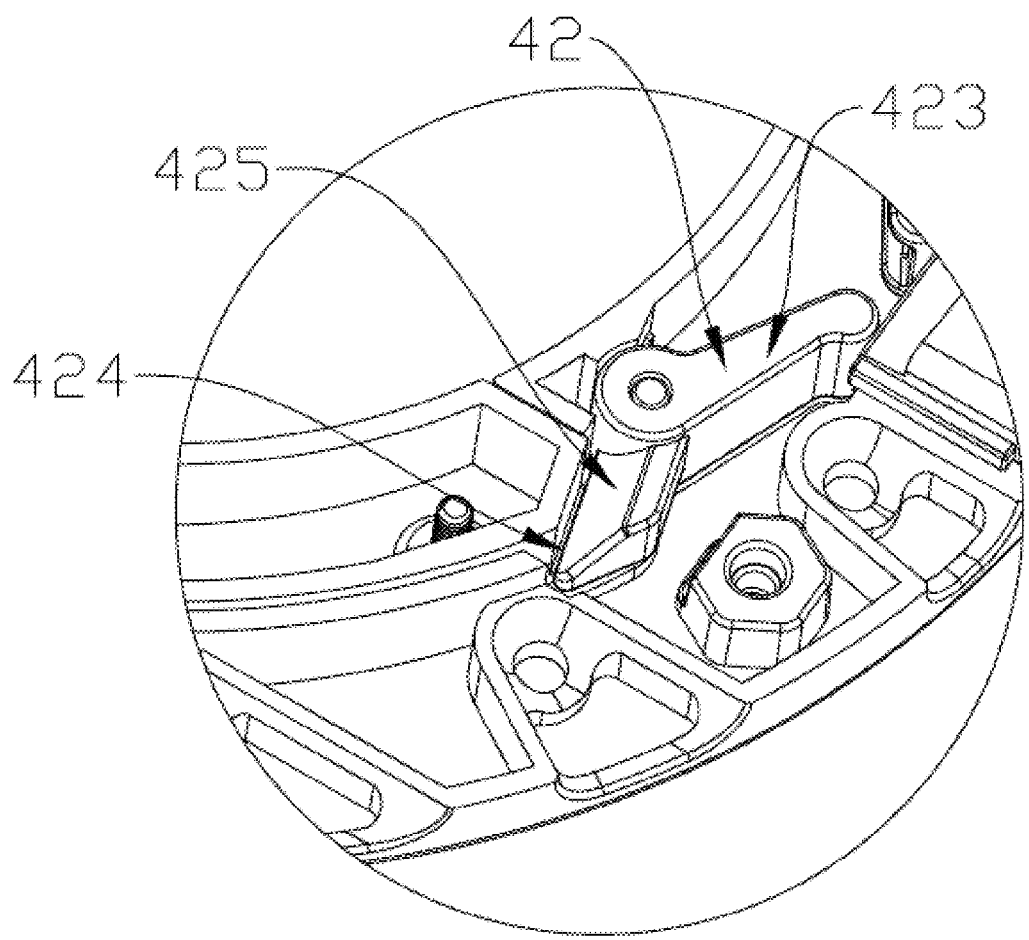
FIG. 17 is an enlarged view of the structure at A in FIG. 16.

As shown in FIGS. 16 and 17, during the switching of the first and second bases 1 and 2 from the unlocked state to the locked state, the beveled surface 425 slides against the inner top surface of locking slot 442 until the inclined surface 424 comes into abutment with the abutment surface 441, at which time there is not only a radial locking force but also a circumferential locking force between the locking part 423 and the locking slot 44, thereby defining the locking mechanism 4 to lock the first and second bases 1 and 2 in the radial direction and circumferential direction.

Figure 18:
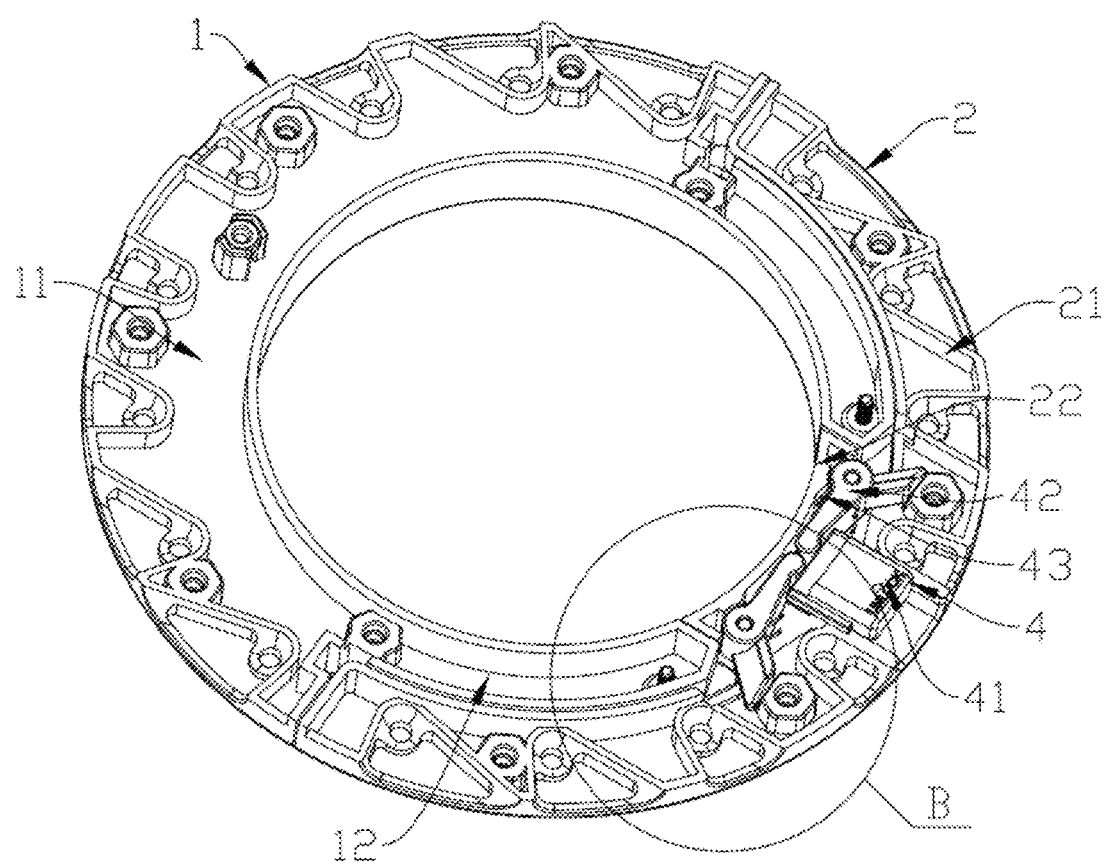
FIG. 18 is an internal schematic view V of the softbox chuck provided in the present application.
Figure 19:
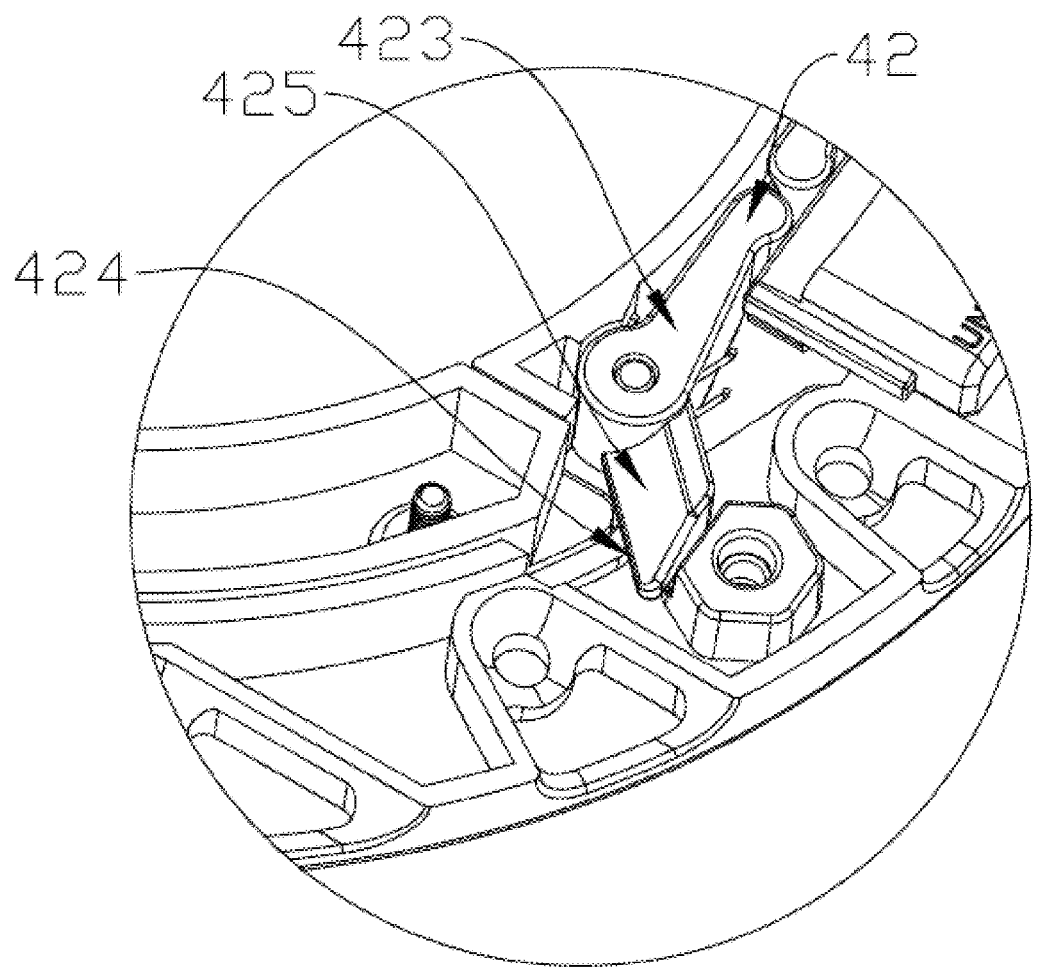
FIG. 19 is an enlarged view of the structure at B in FIG. 18.

As shown in FIGS. 18 and 19, once the unlocking member 41 is pressed inwards by applying an external force, the two locking members 42 are driven to rotate until the locking part 423 is disengaged from the inner bottom surface of the locking slot 44, and the first base 1 and the second base 2 are unlocked to be freely rotatable.

Figure 3:
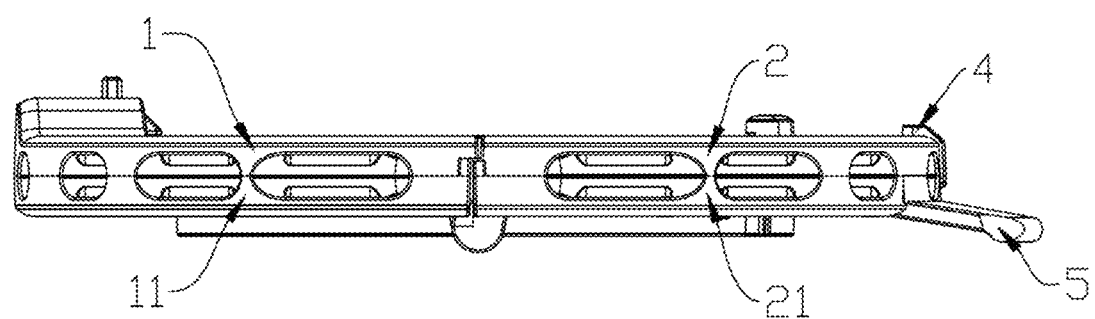
FIG. 3 is a side view I of the softbox chuck provided in the present application, which is in an unfolded state.

In order to facilitate the unfolding and stowing operations, the second base 2 is provided with a handle 5, which is provided corresponding to the protrusion 22. Specifically, the protrusion 22 is located at the inner ring of the second base body 21, and the handle 5 is located at the outer ring of the second base body 21 corresponding to the position of the protrusion 22. The handle 5 extends obliquely from the center of the foldable softbox chuck outwards and towards the direction of the softbox fabric, as shown in FIG. 3. In order to enhance the user's feel, the handle 5 has a curved surface.

Of course, it is also possible that the unlocking member 41 and the locking member 42 are fixedly connected and mated. The locking member 42 is U-shaped, and has two locking parts 421, which are provided corresponding to the two locking slots 44 of the first base 1. One end of the reset member 43 abuts against the locking part 421, and one end abuts against the second base 2. The number of the reset members 43 is two. The reset member 43 is extended to drive the locking part 421 into the locking slot 44. Once the unlocking member 41 is pulled outwards by applying an external force, the locking member 42 compresses the reset member 43 and disengages from the locking slot 44, thereby achieving unlocking of the first base 1 and the second base 2. In order to facilitate the entry of the locking part 421 into the locking slot 44, the end of the locking part 421 away from the unlocking member 41 also has an inclined guide surface.

The above detailed description is intended to be illustrative of the present application rather than limiting. Within the spirit of the present application and the scope of protection defined by the claims, any modifications and alterations made to the present application shall fall within the protection scope of this application.

What is claimed is:

1. A foldable softbox chuck, comprising:
   a first base (1) in the form of an open ring structure with a notch (3), the central angle of which is greater than 180°;
   a second base (2) rotatably connected to the first base (1);
   a locking mechanism (4) configured for locking or unlocking the first base (1) and the second base (2);
   wherein the first base (1) and the second base (2) have at least a folded state and an unfolded state; in the unfolded state, the first base (1) and the second base (2) are located in a same plane, and the second base (2) forms a complete annular shape by complementing the notch (3); and in the folded state, the first base (1) and the second base (2) are stacked one on top of the other.

2. The foldable softbox chuck according to claim 1, wherein, in the unfolded state, the second base (2) compensates for the notch (3) to form a complete annular shape, and the inner ring and the outer ring of the annular shape are both complete circles with smooth transitions.

3. The foldable softbox chuck according to claim 1, wherein the first base (1) comprises a first base body (11), and a first extension arm (12) extending circumferentially from an end portion of the first base body (11); the radial width of the first extension arm (12) is less than a radial width of the first base body (11); the notch (3) comprises an inner notch (31) formed between end portions of the adjacent first extension arms (12) and an outer notch (32) formed between end portions of the first base body (11); the second base (2) comprises a second base body (21), and a protrusion (22) protruding from an inner ring of the second base body (21); the protrusion (22) forms a complete annular shape by complementing the inner notch (31); and the second base body (21) forms a complete annular shape by complementing the outer notch (32).

4. The foldable softbox chuck according to claim 3, wherein the central angle of the first base body (11) is 180°, and the central angle of the second base body (21) is 180°.

5. The foldable softbox chuck according to claim 3, wherein the second base (2) is provided with a handle (5) which extends obliquely and which is arranged in correspondence with the protrusion (22).

6. The foldable softbox chuck according to claim 1, wherein the locking mechanism (4) locks the first base (1) and the second base (2) in a radial direction; or, the locking mechanism (4) locks the first base (1) and the second base (2) in radial and circumferential directions.

7. The foldable softbox chuck according to claim 1, wherein the locking mechanism (4) comprises an unlocking member (41), a locking member (42) cooperating with the unlocking member (41), a reset member (43) abutting against the locking member (42), and a locking slot (44), wherein the locking member (42) and the locking slot (44) are respectively provided on the first base (1) or the second base (2); and an external force is applied to drive the unlocking member (41) to move, and the locking member (42) can be driven to move, so that part of the locking member (42) enters or leaves the locking slot (44).

8. The foldable softbox chuck according to claim 7, wherein the number of the locking member (42) and the locking slot (44) are both two; the number of the unlocking member (41) is one; and the unlocking member (41) moves in a radial direction to drive the two locking members (42) to move synchronously.

9. The foldable softbox chuck according to claim 8, wherein the locking slot (44) is provided on an outer side surface of the first base (1) and is provided close to the notch (3); and the locking member (42) is rotatably connected to the second base (2), and has a locking part (421) having an inclined guide surface (422).

10. The foldable softbox chuck according to claim 8, wherein the locking slot (44) is provided at an end portion of the first base (1) and has an inclined abutment surface (441); and the locking member (42) is rotatably connected to the second base (2) and has a locking part (423) which forms an inclined surface (424) capable of abutting against the abutment surface (441) and has a beveled surface (425) capable of abutting against an inner top surface of locking slot (442).

* * * * *